(12) United States Patent
Iwashita et al.

(10) Patent No.: US 8,786,239 B2
(45) Date of Patent: Jul. 22, 2014

(54) MOTOR DRIVE PWM RECTIFIER HAVING MODULATION SCHEME SELECTOR

(71) Applicant: Fanuc Corporation, Yamanashi (JP)

(72) Inventors: Yasusuke Iwashita, Yamanashi (JP); Masakazu Niwa, Yamanashi (JP); Kenta Yamamoto, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 13/723,700

(22) Filed: Dec. 21, 2012

(65) Prior Publication Data

US 2013/0193897 A1 Aug. 1, 2013

(30) Foreign Application Priority Data

Feb. 1, 2012 (JP) .................................. 2012-019645

(51) Int. Cl.
*H02P 3/00* (2006.01)
*G05B 11/18* (2006.01)
*H02P 27/00* (2006.01)
*H02P 27/04* (2006.01)

(52) U.S. Cl.
USPC ........... 318/503; 318/590; 318/767; 318/771; 318/801; 318/809

(58) Field of Classification Search
USPC .................. 318/503, 590, 767, 771, 801, 809
See application file for complete search history.

(56) References Cited

U.S. PATENT DOCUMENTS

| | | | | | |
|---|---|---|---|---|---|
| 5,406,185 | A | * | 4/1995 | Strunk | 318/767 |
| 5,614,803 | A | * | 3/1997 | Morioka et al. | 318/801 |
| 5,701,066 | A | * | 12/1997 | Matsuura et al. | 318/808 |
| 2004/0007998 | A1 | * | 1/2004 | Yasohara et al. | 318/437 |
| 2010/0214809 | A1 | * | 8/2010 | Iwashita et al. | 363/127 |
| 2012/0229058 | A1 | * | 9/2012 | Kim | 318/400.02 |

FOREIGN PATENT DOCUMENTS

| | | |
|---|---|---|
| JP | 8-023698 A | 1/1996 |
| JP | 2004-048885 A | 2/2004 |
| JP | 2006042579 A | 2/2006 |
| JP | 2008109768 A | 5/2008 |
| JP | 2010-200412 A | 9/2010 |

* cited by examiner

*Primary Examiner* — Eduardo Colon Santana
*Assistant Examiner* — Gabriel Agared
(74) *Attorney, Agent, or Firm* — Lowe Hauptman & Ham, LLP

(57) ABSTRACT

A motor drive PWM rectifier includes a control section which generates the PWM signal in accordance with either a three-phase modulation scheme or a two-phase modulation scheme in which a PWM voltage command for one phase selected from among three phases each constituting the PWM voltage command in the three-phase modulation scheme is set and held at a level equivalent to a maximum value or minimum value of the PWM carrier and in which a PWM voltage command for the other two phases created by also applying an offset, required to achieve the setting, to the other two phases, a detecting section which detects three-phase AC current and outputs a detected current value, and a selecting section which selects the two-phase modulation scheme when the detected current value is larger than a first threshold value but smaller than a second threshold value, and otherwise selects the three-phase modulation scheme.

4 Claims, 10 Drawing Sheets

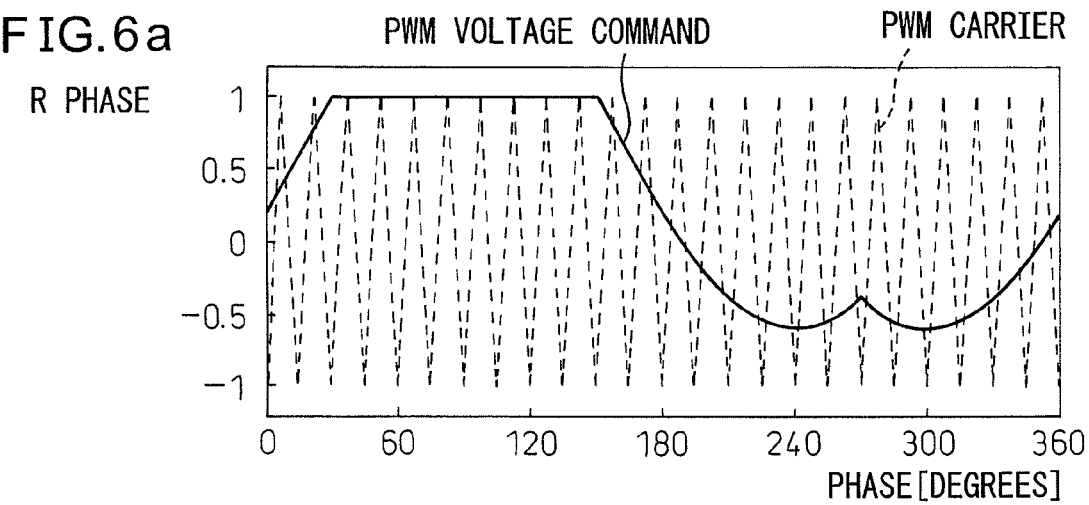
FIG.6a R PHASE
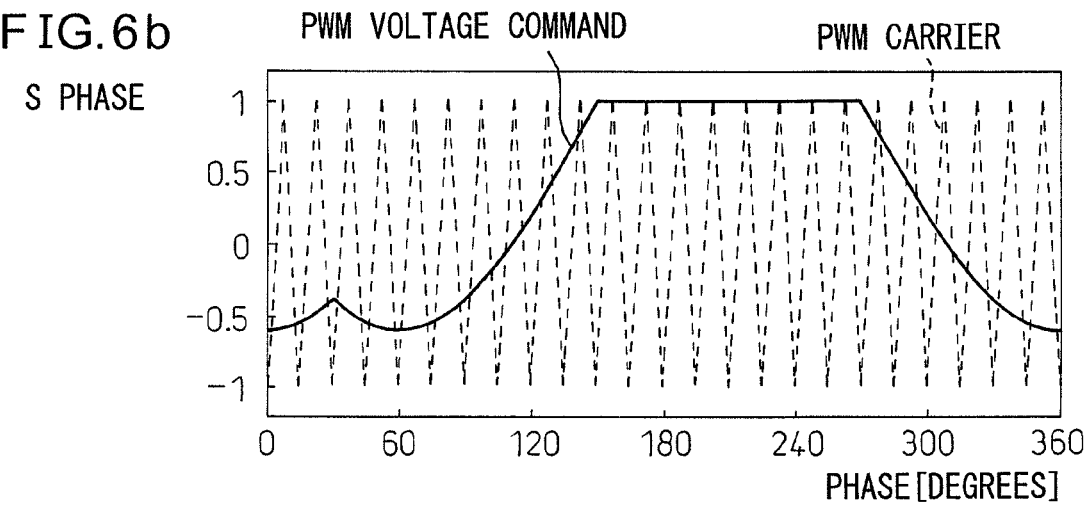
FIG.6b S PHASE
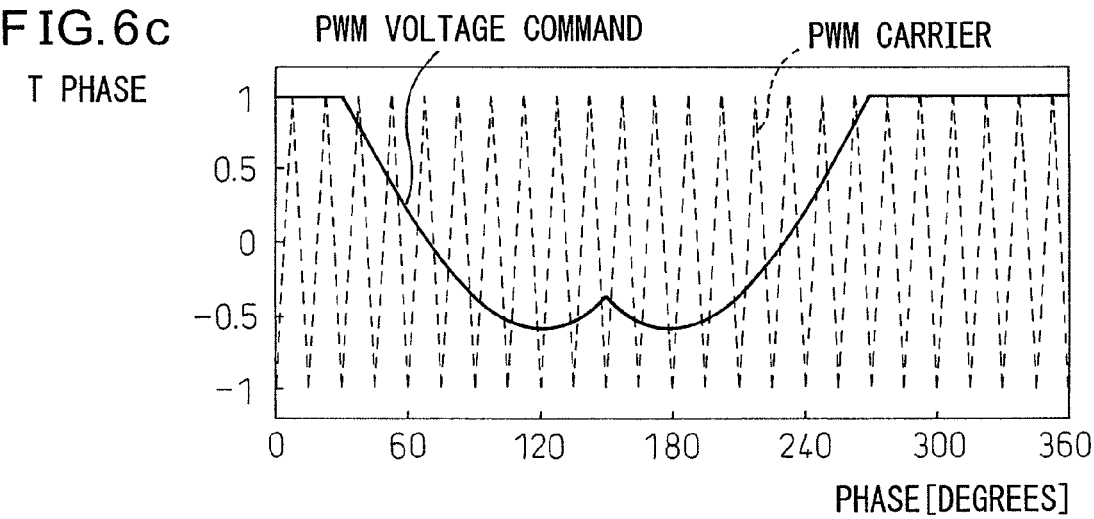
FIG.6c T PHASE

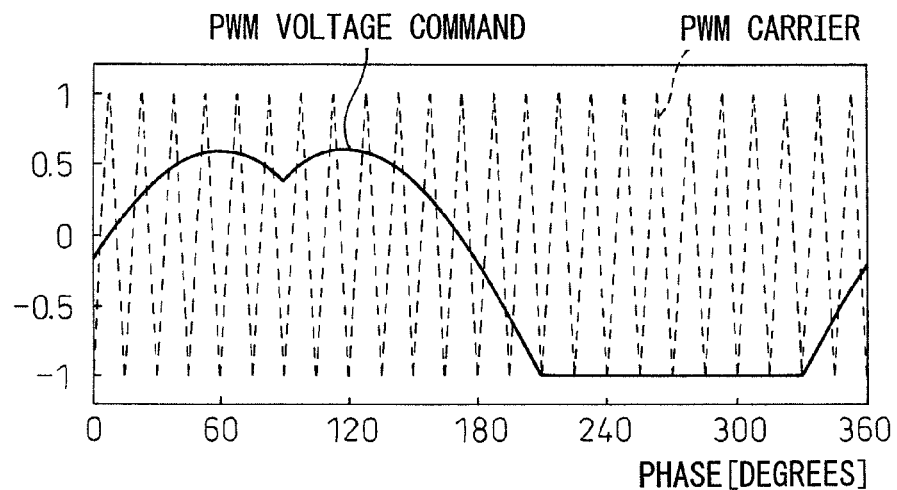
FIG.7a R PHASE
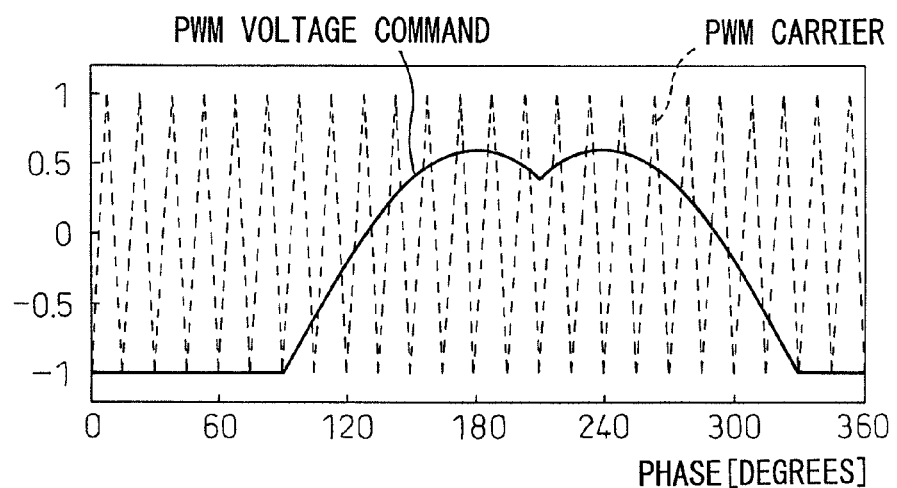
FIG.7b S PHASE
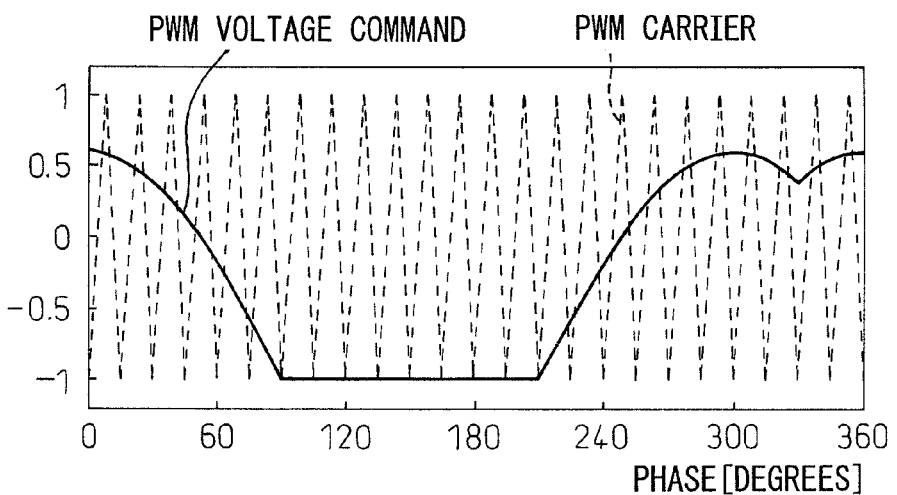
FIG.7c T PHASE

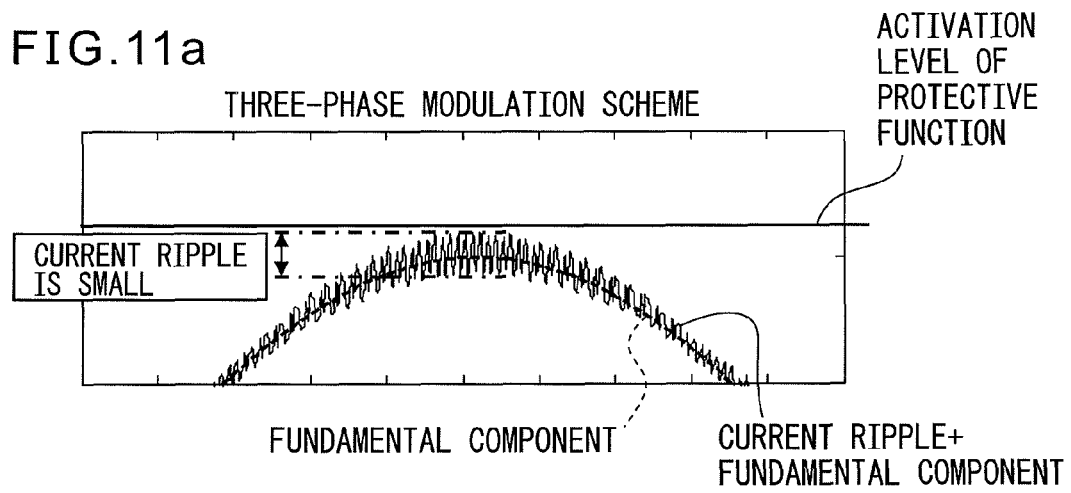
FIG.11a THREE-PHASE MODULATION SCHEME
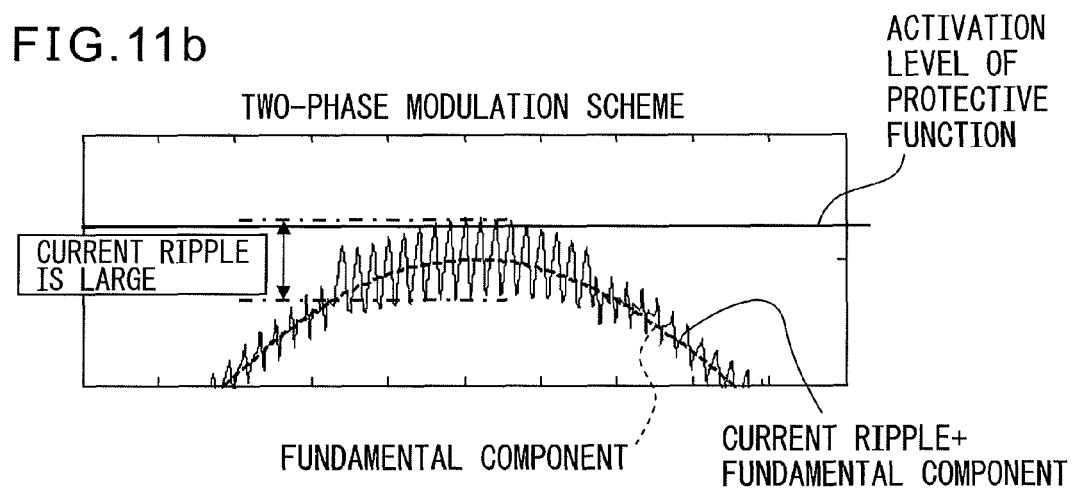
FIG.11b TWO-PHASE MODULATION SCHEME

MOTOR DRIVE PWM RECTIFIER HAVING MODULATION SCHEME SELECTOR

RELATED APPLICATIONS

The present application is based on, and claims priority from, Japanese Application Number 2012-019645, filed Feb. 1, 2012, the disclosure of which is hereby incorporated by reference herein in its entirety.

BACKGROUND OF THE INVENTION

1. Field of the Invention

The present invention relates to a motor drive PWM rectifier for converting three-phase AC power to DC power by controlling switching devices using a PWM signal (pulse-width modulation signal).

2. Description of the Related Art

In a motor control apparatus for driving a machine tool, industrial machine, robot or the like, a motor drive converter is used that converts AC commercial power to DC power and that supplies the DC power to an inverter for driving a motor.

A diode rectifier is an example of such a converter. While the diode rectifier has the advantage of being inexpensive, the disadvantage is that power supply harmonics and reactive power increase.

In view of this, the application of rectifiers using pulse width modulation (PWM) (hereinafter referred to as "PWM rectifiers") has been increasing in recent years due to the need to reduce power supply harmonics and reactive power.

FIG. 9 is a diagram showing the configuration of a conventional PWM rectifier. In the PWM rectifier 100, a main circuit 10 includes transistors 12 to 17, diodes 18 to 23, and a smoothing capacitor 24 connected as shown. A three-phase AC power supply 30 is connected via an AC reactor 26 to the input side of the main circuit 10, and a load 32 such as a PWM inverter is connected to the output side.

An adder 36 outputs a difference (voltage difference) of the output voltage of the PWM rectifier 100, i.e., the voltage across the smoothing capacitor 24, from a voltage command. A voltage controller 34 takes as inputs the voltage difference supplied from the adder 36 and the voltage from the three-phase power supply 30, and outputs a current command. An adder 38 outputs a difference (current difference) of the current detected by a current detector 28 provided at the AC input side of the PWM rectifier 100 from the current command. A current controller 140 compares a PWM voltage command, created based on the current difference, with a constant-amplitude, constant-frequency PWM carrier (pulse-width modulation carrier) and, based on the result of the comparison, outputs a PWM signal (pulse-width modulation signal) for controlling the transistors 12 to 17.

FIG. 10 is a diagram for explaining a three-phase modulation scheme used in the conventional PWM rectifier. In FIG. 10, PWM voltage commands for R phase, S phase, and T phase in the three-phase modulation scheme are indicated by solid lines, and the PWM carrier to be compared with them is indicated by dashed lines. In the current controller 140, the PWM voltage command for each phase is compared with the PWM carrier having a triangular waveform, and when the PWM voltage command is larger than the PWM carrier, an associated one of the upper transistors 12, 14, and 16 in FIG. 9 is turned on and an associated one of the lower transistors 13, 15, and 17 is turned off; on the other hand, when the PWM voltage command is smaller than the PWM carrier, the associated one of the lower transistors 13, 15, and 17 in FIG. 9 is turned on and the associated one of the upper transistors 12, 14, and 16 is turned off. As shown in FIG. 10, as the value of the PWM voltage command for each phase varies, the ON period of each transistor connected to that phase varies; i.e., as the value of the PWM voltage command approaches the maximum value of the PWM carrier, the ON period of the upper transistor connected to that phase increases, and as it approaches the minimum value, the ON period of the lower transistor connected to that phase increases.

In the PWM rectifier, switching losses increase because high-speed switching is performed by the switching devices as described above. Accordingly, the PWM rectifier has the problem that, compared with the traditional diode rectifier, losses in the apparatus as a whole increase and the size of the apparatus also increases.

To solve this problem, the prior art has used a technique that decreases the PWM frequency in regions where the amplitude of the AC input current is large. This method is effective in reducing the switching losses (heating) of the switching devices and suppressing the increase in the apparatus size. However, the prior art method has had the problem that the response of the controller degrades because the feedback sampling period is increased as the PWM frequency decreases.

In view of this, there is proposed, for example, in Japanese Unexamined Patent Publication No. 2010-200412, a PWM rectifier that can reduce switching losses without incurring degradation of controllability by using a two-phase modulation scheme which seeks to decrease the number of switching operations by setting and holding one of three-phase PWM voltage commands to a level equivalent to the maximum or minimum value of the PWM carrier in a large current region where switching losses increase.

On the other hand, there is proposed, for example, in Japanese Unexamined Patent Publication No. 2004-048885, a PWM inverter that uses a technique that selects a three-phase modulation scheme or a two-phase modulation scheme, depending on whether precedence should to be given to the accuracy of current control or the suppression of heating, when outputting an AC voltage by converting a DC voltage using a PWM signal.

There is also proposed, for example, in Japanese Unexamined Patent Publication No. H08-023698, a PWM inverter that uses a technique that switches the modulation scheme from the three-phase modulation scheme to the two-phase modulation scheme to reduce the distortion of actual current waveform when the motor is in regenerative mode or to suppress transient fluctuations in current and torque when the motor is switched from regenerative mode to powering mode.

According to the above two-phase modulation scheme, the switching losses (heating) of the switching devices can be reduced, but the proportion of ripple components (harmonic components) relative to the fundamental component of the AC input current increases, since the number of switching operations is smaller than in the case of the three-phase modulation scheme. That is, when it is assumed that the fundamental component of the AC input current is the same between the two-phase modulation scheme and the three-phase modulation scheme, there arises the problem that the peak value of the AC current becomes larger in the case of the two-phase modulation scheme.

Generally, in a PWM rectifier, in order to prevent the switching devices from being operated above their maximum rated current, a protective function is provided that monitors the AC input current in real time and that, when the input current value exceeds a predetermined value, causes the PWM operation to stop by issuing an alarm or by forcefully stopping the switching operation and limiting the current by hardware means.

However, since the proportion of ripple components relative to the fundamental component of the AC input current increases in the case of the two-phase modulation scheme, as described above, the two-phase modulation scheme has the problem that the protective function is activated earlier than in the case of the three-phase modulation scheme. FIG. 11a is a diagram for explaining a current ripple that occurs at the AC input side of the conventional PWM rectifier in the case of the three-phase modulation scheme. FIG. 11b is a diagram for explaining a current ripple that occurs at the AC input side of the conventional PWM rectifier in the case of the two-phase modulation scheme. In FIGS. 11a and 11b, the fundamental component of the AC input current plus the ripple component is indicated by solid lines, and the fundamental component of the AC input current is indicated by dashed lines. As compared with the current ripple in the case of the three-phase modulation scheme shown in FIG. 11a, the magnitude of the current ripple relative to the fundamental component of the AC input current increases in the case of the two-phase modulation scheme, as shown in FIG. 11b, because the number of switching operations in the region where the current peaks is smaller than in the case of the three-phase modulation scheme. When it is assumed that the activation level of protection function is set as shown in FIGS. 11a and 11b, and that the fundamental component of the AC input current is the same between the two-phase modulation scheme and the three-phase modulation scheme, since the magnitude of the current ripple becomes larger in the two-phase modulation scheme than in the three-phase modulation scheme, the peak value of the AC current increases and, as a result, the protective function becomes easier to activate.

Therefore, according to the method that uses as the modulation scheme for the PWM rectifier the three-phase modulation scheme in the region where the AC input current is small and the two-phase modulation scheme in the region where the AC input current is large, there arises a need to operate the PWM rectifier by reducing its output so as not to activate the protective function; this has led to the problem that, compared with the method that uses the three-phase modulation method at all times regardless of the magnitude of the AC input current, the currents in the switching devices cannot be effectively used, and thus the maximum output of the PWM rectifier drops.

SUMMARY OF THE INVENTION

In view of the above problem, it is an object of the present invention to provide a motor drive PWM rectifier that can reduce the switching losses of the switching devices without having to reduce the maximum output and without degrading the response of the controller.

A motor drive PWM rectifier for converting three-phase AC power to DC power by controlling switching devices using a PWM signal includes a control section which generates the PWM signal in accordance with either a three-phase modulation scheme in which the PWM signal is generated by comparing a PWM voltage command with a constant-amplitude, constant-frequency PWM carrier or a two-phase modulation scheme in which a PWM voltage command for one phase selected from among three phases each constituting the PWM voltage command in the three-phase modulation scheme is set and held at a level equivalent to a maximum value or minimum value of the PWM carrier during a predetermined period and in which a PWM voltage command for the other two phases created by also applying an offset, required to achieve the setting, to the other two phases each constituting the PWM voltage command in the three-phase modulation scheme and in which the PWM signal is generated by comparing the PWM voltage command with the PWM carrier, a detecting section which detects three-phase AC current and outputs a detected current value, and a selecting section which compares the detected current value with a first threshold value larger than zero and a second threshold value larger than the first threshold value, and which selects, as the modulation scheme to be used for the generation of the PWM signal in the control section, the two-phase modulation scheme when the detected current value is larger than the first threshold value but smaller than the second threshold value, and otherwise selects the three-phase modulation scheme.

The detected current value used for comparison with the first and second threshold values in the selecting section is a maximum value of absolute values of phase current amplitudes of the three-phase AC, or a vector norm of a current vector obtained by transforming the three-phase AC current onto two-phase coordinate axes.

The first threshold value is determined based on at least one parameter selected between the thermal rating of the switching devices and the carrier frequency of the PWM carrier.

The second threshold value is determined based on at least one parameter selected from among the maximum rated current of the switching devices, current ripple occurring in the three-phase AC current, and the carrier frequency of the PWM carrier.

BRIEF DESCRIPTION OF THE DRAWINGS

The present invention will be more clearly understood with reference to the following accompanying drawings.

FIGS. 6a, 6b, and 6c are diagrams for explaining a second example of a two-phase modulation scheme used in the PWM rectifier.

FIGS. 7a, 7b, and 7c are diagrams for explaining a third example of a two-phase modulation scheme used in the PWM rectifier.

FIG. 11a is a diagram for explaining a current ripple that occurs at the AC input side of the conventional PWM rectifier in the case of the three-phase modulation scheme.

FIG. 11b is a diagram for explaining a current ripple that occurs at the AC input side of the conventional PWM rectifier in the case of the two-phase modulation scheme.

DETAILED DESCRIPTION

A motor drive PWM rectifier having a modulation scheme selector will be described below with reference to the drawings. It should, however, be understood that the present invention is not limited to the accompanying drawings, nor is it limited to the particular embodiments described herein.

Figure 1:
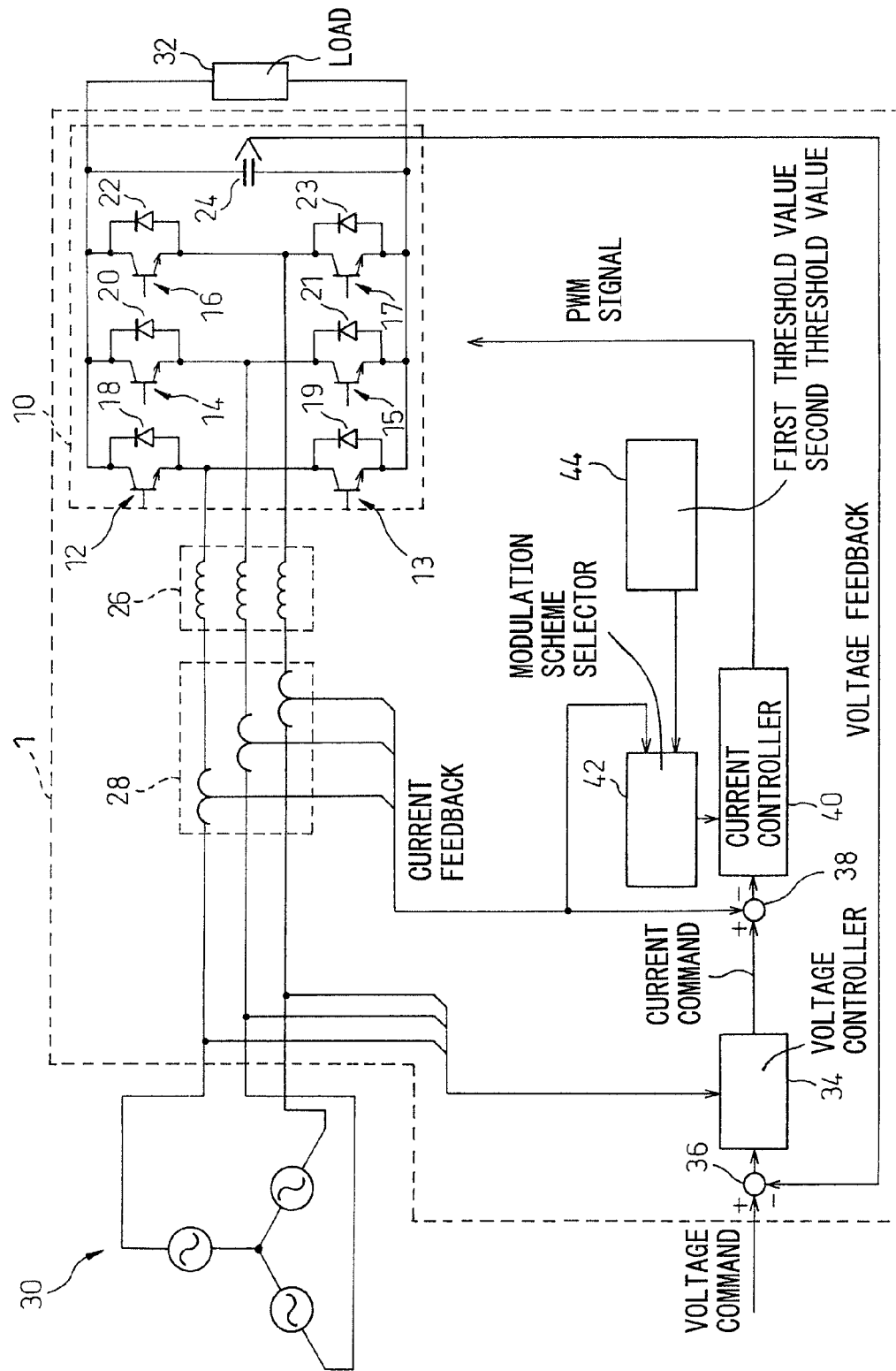
FIG. 1 is a diagram showing the configuration of a PWM rectifier.

FIG. 1 is a diagram showing the configuration of the PWM rectifier. The motor drive PWM rectifier 1 is connected at its AC input to a three-phase AC power supply 30, converts three-phase AC power supplied from the three-phase AC power supply 30 to DC power by controlling switching devices using a PWM signal, and supplies the DC power to a load 32 connected at its DC output. The load 32 is an inverter which outputs AC power for driving a motor.

The PWM rectifier 1 includes a current controller 40 as a control section which generates the PWM signal (pulse-width modulation signal) in accordance with either a three-phase modulation scheme in which the PWM signal is generated by comparing a PWM voltage command with a constant-amplitude, constant-frequency PWM carrier (pulse-width modulation carrier) or a two-phase modulation scheme in which a PWM voltage command for one phase selected from among three phases each constituting the PWM voltage command in the three-phase modulation scheme is set and held at a level equivalent to a maximum value or minimum value of the PWM carrier during a predetermined period and in which a PWM voltage command for the other two phases created by also applying an offset, required to achieve the setting, to the other two phases each constituting the PWM voltage command in the three-phase modulation scheme and in which the PWM signal is generated by comparing the PWM voltage command with the PWM carrier, a detecting section which detects the three-phase AC current from the three-phase AC power supply 30 by means of a current detector 28 and outputs a detected current value, and a modulation scheme selector 42 as a selecting section which compares the detected current value with a first threshold value larger than zero and a second threshold value larger than the first threshold value, and which selects, as the modulation scheme to be used for the generation of the PWM signal in the control section (current controller 40), the two-phase modulation scheme when the detected current value is larger than the first threshold value but smaller than the second threshold value, and otherwise selects the three-phase modulation scheme. The first and second threshold values are stored in a memory 44, and the modulation scheme selector 42 retrieves the first and second threshold values as needed from the memory 44 for comparison with the detected current value.

In this way, the modulation scheme selector 42 selects either the three-phase modulation scheme or the two-phase modulation scheme. The current controller 40 generates the PWM signal in accordance with the modulation scheme selected by the modulation scheme selector 42. Details of the operation of the modulation scheme selector 42 will be described later.

In the PWM rectifier 1, a main circuit 10 includes transistors 12 to 17, diodes 18 to 23, and a smoothing capacitor 24 connected as shown. The three-phase AC power supply 30 is connected via an AC reactor 26 to the input side of the main circuit 10, and the load 32 is connected to the output side. In the present embodiment, the transistors are shown as examples of the switching devices constituting the PWM rectifier 1, but the invention is not limited to any particular kind of switching device, and use may be made of any other suitable semiconductor device.

An adder 36 outputs a difference (voltage difference) of the output voltage of the PWM rectifier 1, i.e., the voltage across the smoothing capacitor 24, from the voltage command. A voltage controller 34 takes as inputs the voltage difference supplied from the adder 36 and the voltage from the three-phase power supply 30, and outputs a current command. An adder 38 calculates a difference (current difference) of the current detected by the current detector 28 provided at the AC input side of the PWM rectifier 1 from the current command, and supplies the difference to the current controller 40.

The current controller 40 generates the PWM signal in accordance with the modulation scheme selected by the modulation scheme selector 42 as described above. More specifically, when the modulation scheme selected by the modulation scheme selector 42 is the three-phase modulation scheme, the PWM voltage command generated based on the current difference supplied from the adder 38 is compared with the constant-amplitude, constant-frequency PWM carrier, and the result of the comparison is output as the PWM signal for controlling the transistors 12 to 17. On the other hand, when the modulation scheme selected by the modulation scheme selector 42 is the two-phase modulation scheme, the PWM voltage command generated in accordance with the two-phase modulation scheme is compared with the PWM carrier, and the result of the comparison is output as the PWM signal.

The above processing performed by the voltage controller 34, adders 36 and 38, current controller 40, and modulation scheme selector 42 is implemented using an operational processor such as a DSP, FPGA, or microcomputer.

Next, the operation of the modulation scheme selector 42 will be described in detail.

Figure 2:
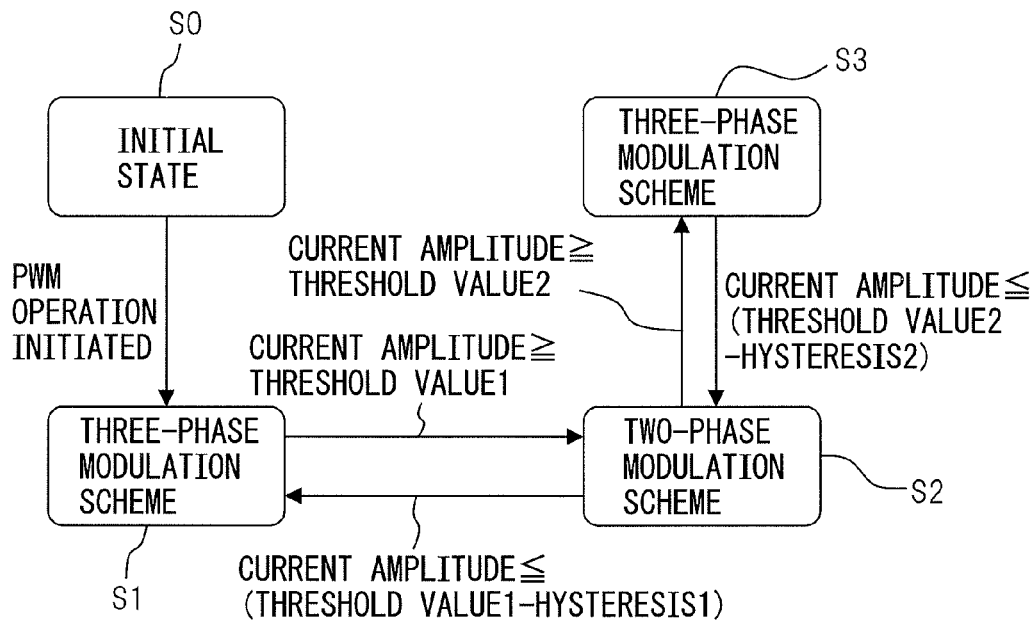
FIG. 2 is a state transition diagram of a modulation scheme in the PWM rectifier.
Figure 3:
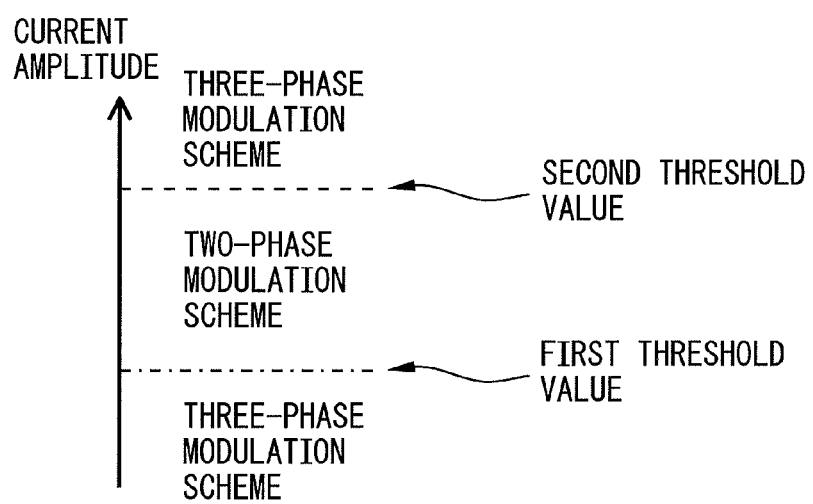
FIG. 3 is a schematic diagram for explaining threshold values to be used in a modulation scheme selecting section in the PWM rectifier.

FIG. 2 is a state transition diagram of the modulation scheme in the PWM rectifier. FIG. 3 is a schematic diagram for explaining the threshold values to be used in the modulation scheme selecting section in the PWM rectifier.

The first threshold value used in the modulation scheme selector 42 for comparison with the detected current value supplied from the current detector 28 is preset to a value larger than zero (0), and the second threshold value is preset to a value larger than the first threshold value.

The first threshold value is determined based on at least one parameter selected between the thermal rating of the switching devices and the carrier frequency of the PWM carrier. The reason that, in addition to the carrier frequency of the PWM carrier, the thermal rating of the switching devices is taken as a parameter for determining the first threshold value is that the first threshold value is used to set a condition for switching between the three-phase modulation scheme and the two-phase modulation scheme, and the two-phase modulation scheme is used to reduce the switching losses (heating) that occur in the switching devices in regions where the current value is large.

On the other hand, the second threshold value is determined based on at least one parameter selected from among the maximum rated current of the switching devices, current ripple occurring in the three-phase AC current, and the carrier frequency of the PWM carrier. The reason that, in addition to the carrier frequency of the PWM carrier, the maximum rated current of the switching devices and current ripple occurring in the three-phase AC current are taken as parameters for determining the second threshold value is that the second threshold value is used to set a condition for switching from the two-phase modulation scheme back to the three-phase modulation scheme when the detected current value increases, and that it is intended to enable the PWM rectifier to be operated near the maximum rated current of the switching devices, thus making effective use of the currents in the switching devices and preventing the output of the PWM rectifier from dropping. The modulation scheme selector 42 retrieves the first and second threshold values as needed from the memory 44 for comparison with the detected current value. That is, as shown in FIG. 3, the modulation scheme selector 42 compares the detected current value with the first threshold value larger than zero and the second threshold value larger than the first threshold value; when the detected current value is larger than the first threshold value but smaller than the second threshold value, the two-phase modulation scheme is selected and used for the generation of the PWM signal in the current controller 40, and otherwise, the three-phase modulation scheme is selected and used for the generation of the PWM signal in the current controller 40. This will be described in further detail below with reference to the state transition diagram of FIG. 2.

Figure 10:
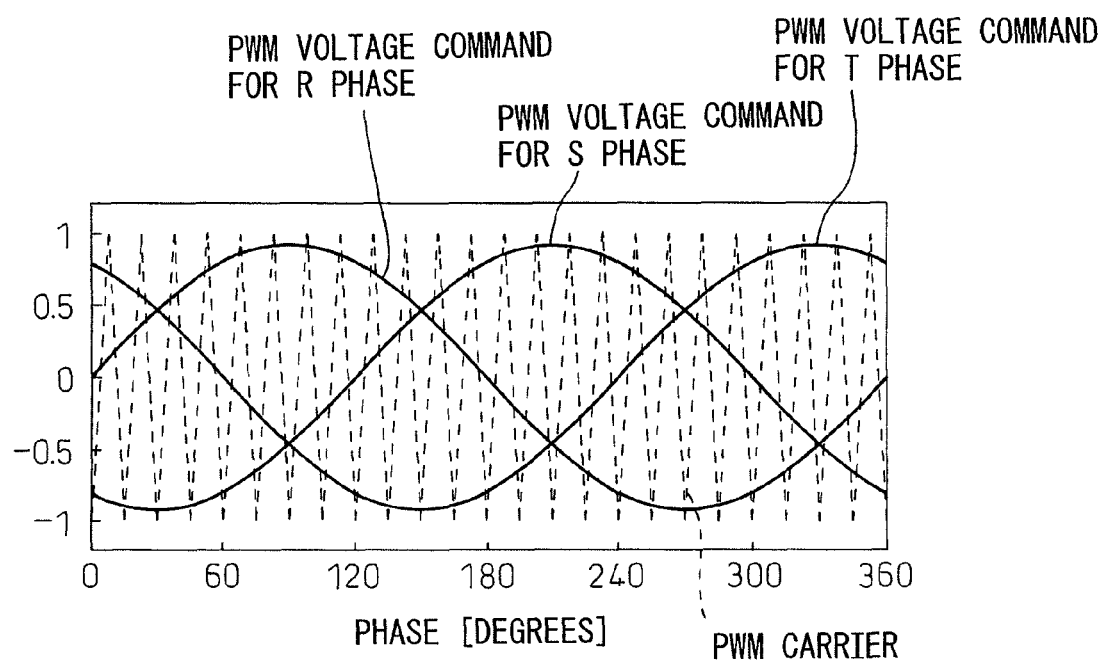
FIG. 10 is a diagram for explaining a three-phase modulation scheme used in the conventional PWM rectifier.

First, when the PWM operation of the PWM rectifier 1 is initiated from initial state $S_0$, a transition is made from initial state S0 to state S1. State S1 is maintained until the detected current value at the AC input side exceeds the first threshold value. While in state S1, the modulation scheme selector 42 selects the three-phase modulation scheme, such as depicted in FIG. 10, as the modulation scheme to be used for the generation of the PWM signal in the current controller 40.

When the detected current value at the AC input side exceeds the first threshold value, a transition is made from state S1 to state S2. State S2 is maintained until the detected current value at the AC input side exceeds the second threshold value or until the detected current value at the AC input side drops to a value equal to or smaller than (FIRST THRESHOLD VALUE−FIRST HYSTERESIS). That is, hysteresis is provided for switching to be effected by evaluating the switching condition. While in state S2, the modulation scheme selector 42 selects the two-phase modulation scheme as the modulation scheme to be used for the generation of the PWM signal in the current controller 40. The detected current value exceeding the first threshold value means that the region where the AC input current is large is entered, but according to the embodiment of the present invention, since the modulation scheme used for the generation of the PWM signal is switched here from the three-phase modulation scheme to the two-phase modulation scheme, the switching losses of the switching devices can be reduced, compared with the case if the three-phase modulation scheme continued to be used.

When the detected current value at the AC input side exceeds the second threshold value, a transition is made from state S2 to state S3, and the modulation scheme selector 42 once again selects the three-phase modulation scheme. State S3 is maintained until the detected current value at the AC input side drops to a value equal to or smaller than (SECOND THRESHOLD VALUE−SECOND HYSTERESIS). That is, hysteresis is provided for switching to be effected by evaluating the switching condition. While in state S3, the modulation scheme selector 42 selects the three-phase modulation scheme as the modulation scheme to be used for the generation of the PWM signal in the current controller 40. The detected current value exceeding the second threshold value means that the detected current value at the AC input side is near the maximum rated current, but according to the embodiment of the present invention, the modulation scheme used for the generation of the PWM signal is switched from the two-phase modulation scheme in which the current ripple is large to the three-phase modulation scheme in which the current ripple is small, thereby reducing the magnitude of the current ripple relative to the fundamental component of the AC input current. This enables the PWM rectifier to be operated near the maximum rated current of the switching devices. In the prior art, there has been a need to reduce the output of the PWM rectifier in order not to activate the switching device protective function commonly provided in the PWM rectifier; by contrast, in the present invention, there is no such need, and the PWM rectifier 1 can be operated without reducing its maximum output, because effective use can be made of the currents in the switching devices. The current near the maximum rated current, which is input from the AC input side to the PWM rectifier 1, is not applied at all times, but applied only momentarily in a transient state at such times as accelerating or decelerating the motor, since the load 32 is an inverter for supplying AC drive power to the motor. As a result, the increase in switching losses that occurs when switching the modulation scheme from the two-phase modulation scheme back to the three-phase modulation scheme in the region near the maximum rated current of the switching devices, as described above, is negligible compared with the losses in the apparatus as a whole. Accordingly, in the PWM rectifier 1, if the modulation scheme is switched, no thermal problem occurs in the switching devices.

When the detected current value at the AC input side drops to a value equal to or smaller than (SECOND THRESHOLD VALUE−SECOND HYSTERESIS), a transition is made from state S3 to state S2, and the modulation scheme selector 42 selects the two-phase modulation scheme. As earlier described, state S2 is maintained until the detected current value at the AC input side exceeds the second threshold value or until the detected current value at the AC input side drops to a value equal to or smaller than (FIRST THRESHOLD VALUE−FIRST HYSTERESIS).

When the detected current value at the AC input side drops to a value equal to or smaller than (FIRST THRESHOLD VALUE−FIRST HYSTERESIS), a transition is made from state S2 to state S1, and the modulation scheme selector 42 selects the three-phase modulation scheme. As earlier described, state S1 is maintained until the detected current value at the AC input side exceeds the first threshold value.

Figure 4:
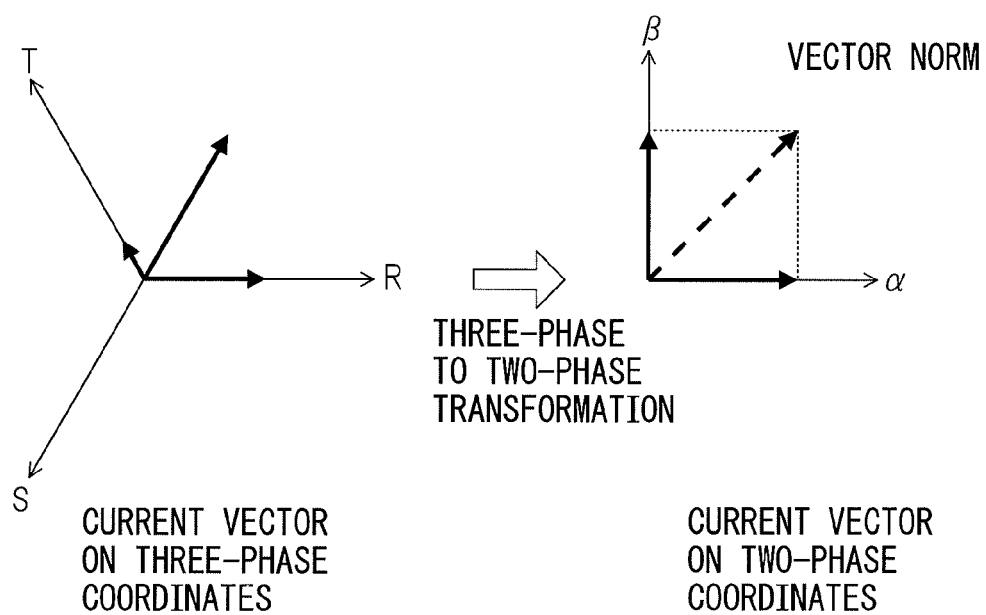
FIG. 4 is a diagram for explaining how a current vector is transformed from three-phase coordinates to two-phase coordinates.

The detected current value at the AC input side is compared in the modulation scheme selector 42 with the first and second threshold values. The detected current value to be compared in the modulation scheme selector 42 with the first and second threshold values is the maximum value of the absolute values of the phase current amplitudes of the three-phase AC, or a vector norm of a current vector obtained by transforming the three-phase AC current onto two-phase coordinate axes. A description will be given for the case where the vector norm of the current vector is used. FIG. 4 is a diagram for explaining how the current vector is transformed from three-phase coordinates to two-phase coordinates. As shown in FIG. 4, the current vector on the three-phase coordinates represented by R, S, and T axes is transformed through three-phase to two-phase transformation (the so-called αβ transformation) to the current vector on the two-phase coordinates represented by α and β axes. The vector norm of the current vector obtained by transforming the three-phase AC current onto the two-phase coordinate axes in this way may be used as the detected current value to be compared with the first and second threshold values.

Next, the two-phase modulation scheme used in the PWM rectifier will be described. In the two-phase modulation scheme, the voltage command for one phase selected from among the three phases each constituting the PWM voltage command in the three-phase modulation scheme is set and held at a level equivalent to the maximum or minimum value of the PWM carrier during a predetermined period, and the PWM signal is generated by comparing with the PWM carrier a combination of the PWM voltage command for one phase and two PWM voltage commands for other two phases created by also applying an offset, required to achieve the setting, to the other two phases. The two-phase modulation scheme used in the PWM rectifier according to the embodiment of the present invention can be implemented, for example, in one of four ways as described below.

Figure 5A:
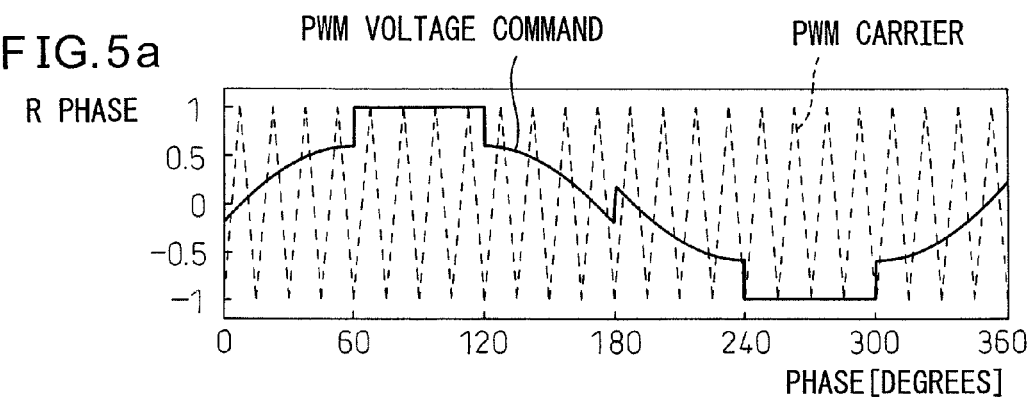
FIGS. 5a, 5b, and 5c are diagrams for explaining a first example of a two-phase modulation scheme used in the PWM rectifier.
Figure 5B:
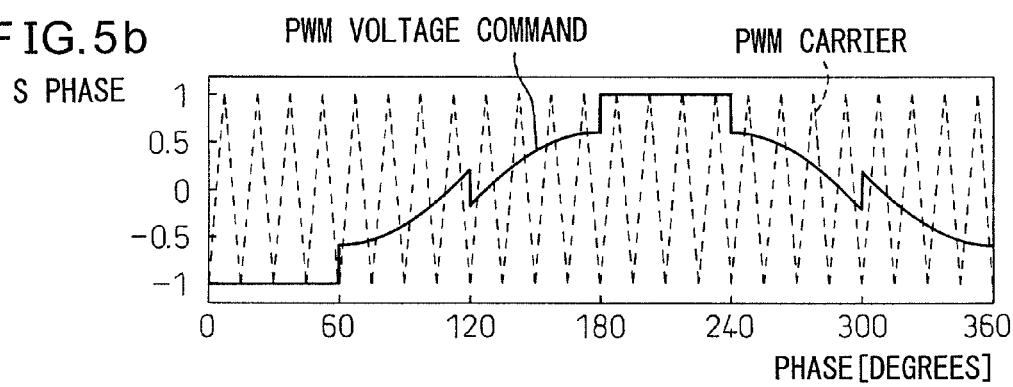
Figure 5C:
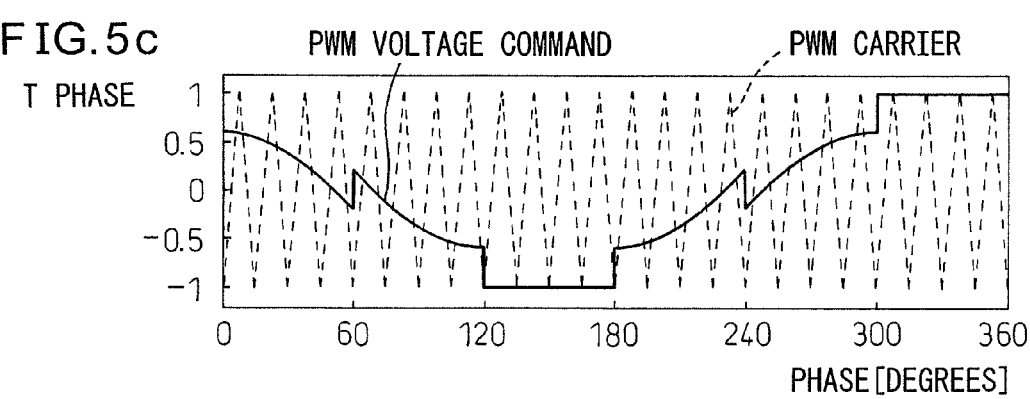

FIGS. 5a, 5b, and 5c are diagrams for explaining the first example of the two-phase modulation scheme used in the PWM rectifier.

As shown in FIGS. 5a, 5b, and 5c, in the two-phase modulation scheme according to the first example, the PWM voltage command for one phase whose PWM voltage command is the largest in absolute value among the three phases each constituting the PWM voltage command in the three-phase modulation scheme is set and held at the level equivalent to the maximum or minimum value of the PWM carrier during the predetermined period including the time at which the absolute value of that PWM voltage command becomes maximum, and the offset required to achieve the setting is also applied to the other two phases. More specifically, as shown in FIGS. 5a, 5b, and 5c, the largest PWM voltage command among the PWM voltage commands for the R, S, and T phases is made to increase to the level corresponding to the maximum value of the PWM carrier, and the offset (increase) is also applied to the other two phases; likewise, the smallest PWM voltage command among the PWM voltage commands for the R, S, and T phases is made to decrease to the level corresponding to the minimum value of the PWM carrier, and the offset (decrease) is also applied to the other two phases.

FIGS. 6a, 6b, and 6c are diagrams for explaining the second example of the two-phase modulation scheme used in the PWM rectifier.

As shown in FIGS. 6a, 6b, and 6c, in the two-phase modulation scheme according to the second example, the PWM voltage command for one phase whose PWM voltage command is the largest in value among the three phases each constituting the PWM voltage command in the three-phase modulation scheme is set and held at the level equivalent to the maximum value of the PWM carrier during the predetermined period including the time at which that PWM voltage command becomes maximum, and the offset (increase) required to achieve the setting is also applied to the other two phases. More specifically, as shown in FIGS. 6a, 6b, and 6c, the largest PWM voltage command among the PWM voltage commands for the R, S, and T phases is made to increase to the level corresponding to the maximum value of the PWM carrier, and the offset (increase) is also applied to the other two phases.

FIGS. 7a, 7b, and 7c are diagrams for explaining the third example of the two-phase modulation scheme used in the PWM rectifier.

As shown in FIGS. 7a, 7b, and 7c, in the two-phase modulation scheme according to the third example, the PWM voltage command for one phase whose PWM voltage command is the smallest in value among the three phases each constituting the PWM voltage command in the three-phase modulation scheme is set and held at the level equivalent to the minimum value of the PWM carrier during the predetermined period including the time at which that PWM voltage command becomes minimum, and the offset (decrease) required to achieve the setting is also applied to the other two phases. More specifically, as shown in FIGS. 7a, 7b, and 7, the smallest PWM voltage command among the PWM voltage commands for the R, S, and T phases is made to decrease to the level corresponding to the minimum value of the PWM carrier, and the offset (decrease) is also applied to the other two phases.

Figure 8A:
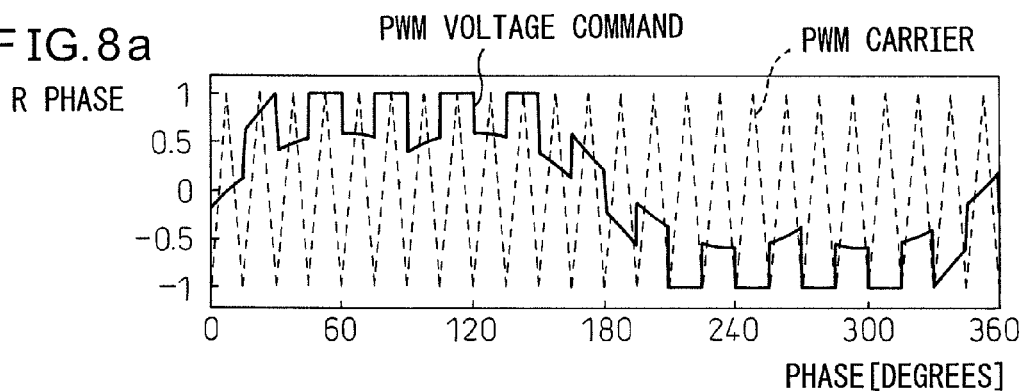
FIGS. 8a, 8b, and 8c are diagrams for explaining a fourth example of a two-phase modulation scheme used in the PWM rectifier.
Figure 8B:
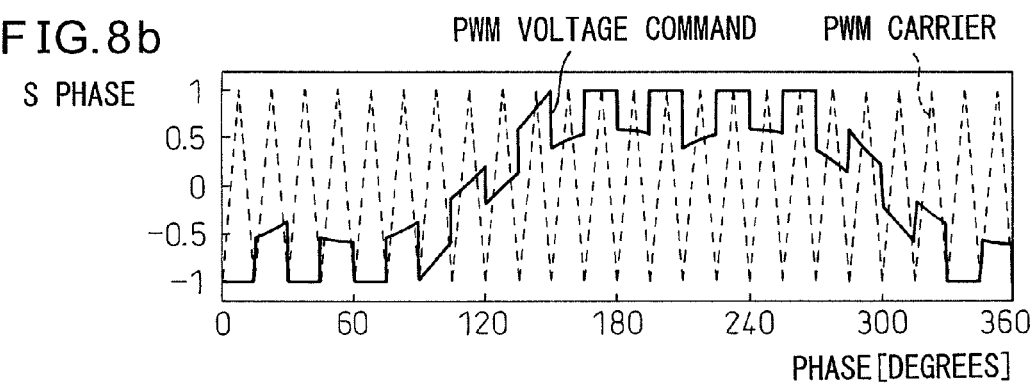
Figure 8C:
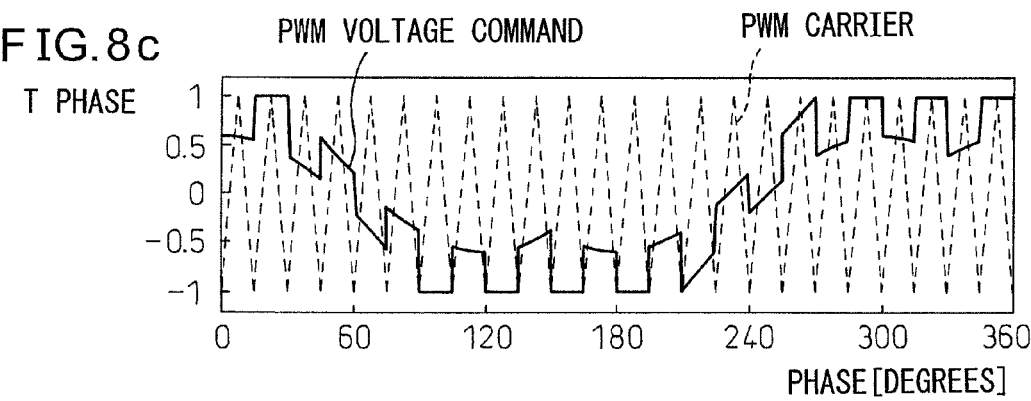
Figure 9:
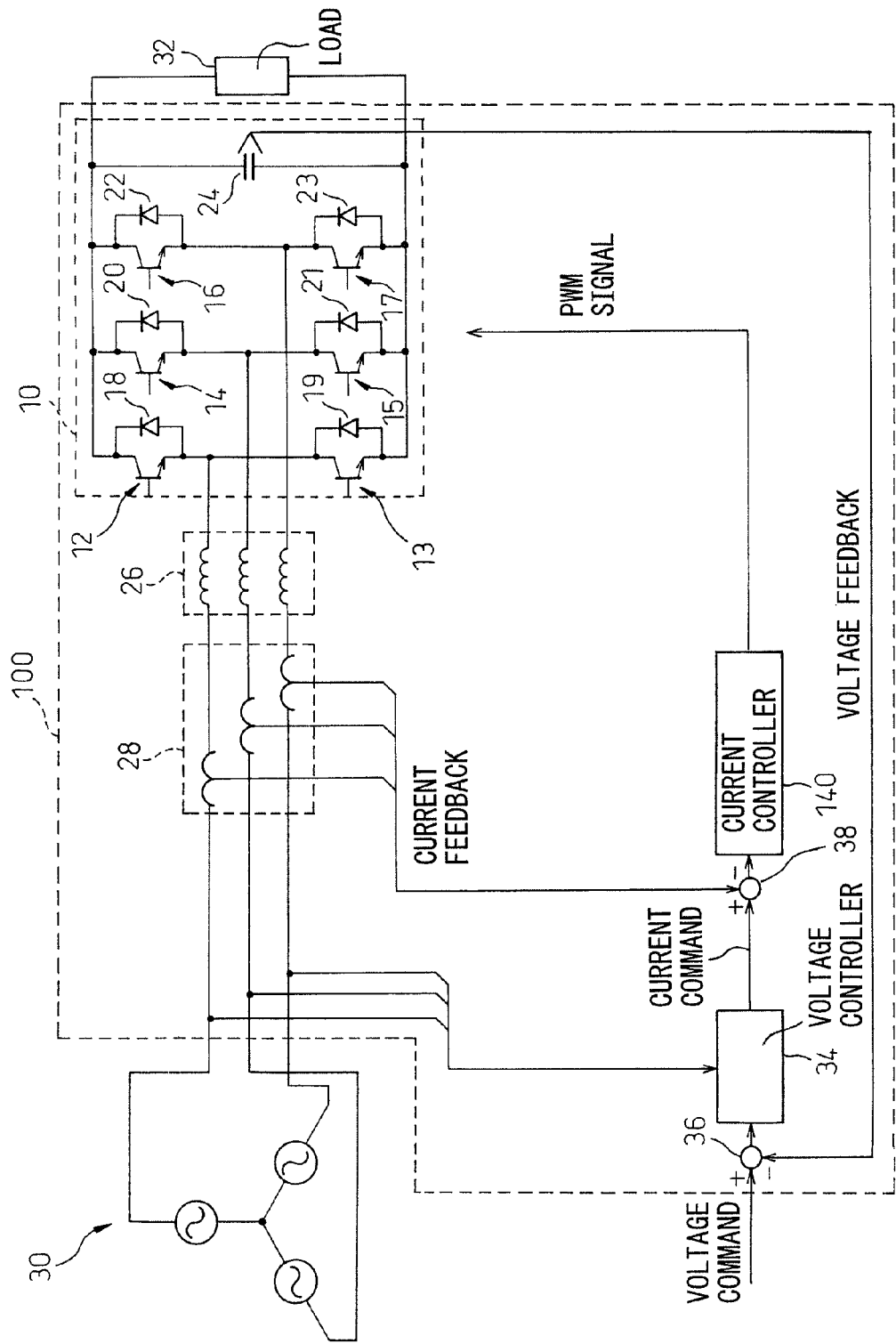
FIG. 9 is a diagram showing the configuration of a conventional PWM rectifier.

FIGS. 8a, 8b, and 8c are diagrams for explaining the fourth example of the two-phase modulation scheme used in the PWM rectifier.

As shown in FIGS. 8a, 8b, and 8c, in the two-phase modulation scheme according to the fourth example, the period during which the PWM voltage command for one phase whose PWM voltage command is the largest in value among the three phases each constituting the PWM voltage command in the three-phase modulation scheme is set and held at the level equivalent to the maximum value of the PWM carrier alternates with the period during which the PWM voltage command for the one phase whose PWM voltage command is the smallest in value among the three phases each constituting the PWM voltage command in the three-phase modulation scheme is set and held at the level equivalent to the minimum value of the PWM carrier. More specifically, as shown in FIGS. 8a, 8b, and 8c, the process of increasing the largest PWM voltage command to the level corresponding to the maximum value of the PWM carrier, according to the second example shown in FIGS. 6a, 6b, and 6c, and the process of decreasing the smallest PWM voltage command to the level corresponding to the minimum value of the PWM carrier, according to the third example shown in FIGS. 7a, 7b, and 7c, are repeated, one alternating with the other. In FIGS. 8a, 8b, and 8c, the repetition period is shown as being set twice the period of the carrier so that the two are synchronized to each other, but the repetition period need not be set twice or an integral multiple of the period of the carrier, nor need to be synchronized to each other.

In the two-phase modulation scheme according to any of the first to fourth examples described above, since no switching is performed for the phase whose PWM voltage command has been set to a level that matches the PWM carrier, the number of switching operations decreases to two thirds of that in the three-phase modulation scheme; in this way, by switching the PWM modulation scheme from the three-phase modulation scheme to the two-phase modulation scheme, the switching losses can be reduced.

The present invention can be applied to a PWM rectifier that is used, in a motor control apparatus for driving a machine tool, industrial machine, robot or the like, as a converter that converts AC commercial power to DC power and that supplies the DC power to an inverter for driving a motor.

In the motor drive PWM rectifier for converting three-phase AC power to DC power by controlling the switching devices using a PWM signal, the detected current value at the AC input side is compared with the first threshold value larger than zero and the second threshold value larger than the first threshold value and, when the detected current value is larger than the first threshold value but smaller than the second threshold value, the two-phase modulation scheme, not the three-phase modulation scheme, is selected for the generation of the PWM signal, so that the switching losses (heating) of the switching devices can be reduced. Then, when the detected current value exceeds the second threshold value, the modulation scheme used for the generation of the PWM signal is switched from the two-phase modulation scheme to the three-phase modulation scheme, thereby reducing the magnitude of the current ripple relative to the fundamental component of the AC input current; this enables the motor drive PWM rectifier to be operated near the maximum rated current of the switching devices. In the prior art, there has been a need to reduce the output of the PWM rectifier in order not to activate the semiconductor switching device protective function commonly provided in the PWM rectifier; by contrast, in the present invention, there is no such need, and the motor drive PWM rectifier can be operated without reducing its maximum output. Therefore, according to the present invention, a motor drive PWM rectifier can be achieved that can reduce the switching losses of the switching devices without having to reduce the maximum output and without degrading the response of the controller.

What is claimed is:

1. A motor drive PWM rectifier for converting three-phase AC power to DC power by controlling switching devices using a PWM signal, comprising:

a control section which generates said PWM signal in accordance with either a three-phase modulation scheme in which said PWM signal is generated by comparing a PWM voltage command with a constant-amplitude, constant-frequency PWM carrier or a two-phase modulation scheme in which a PWM voltage command for one phase selected from among three phases each constituting said PWM voltage command in said three-phase modulation scheme is set and held at a level equivalent to a maximum value or minimum value of said PWM carrier during a predetermined period and in which a PWM voltage command for the other two phases created by also applying an offset, required to achieve said setting, to the other two phases each constituting said PWM voltage command in said three-phase modulation scheme and in which said PWM signal is generated by comparing said PWM voltage command with said PWM carrier;

a detecting section which detects three-phase AC current and outputs a detected current value; and a selecting section which compares said detected current value with a first threshold value larger than zero and a second threshold value larger than said first threshold value, and which selects, as the modulation scheme to be used for the generation of said PWM signal in said control section, said two-phase modulation scheme when said detected current value is larger than said first threshold value but smaller than said second threshold value, and otherwise selects said three-phase modulation scheme.

2. The motor drive PWM rectifier according to claim 1, wherein said detected current value is a maximum value of absolute values of phase current amplitudes of said three-phase AC, or a vector norm of a current vector obtained by transforming said three-phase AC current onto two-phase coordinate axes.

3. The motor drive PWM rectifier according to claim 1, wherein said first threshold value is determined based on at least one parameter selected between the thermal rating of said switching devices and the carrier frequency of said PWM carrier.

4. The motor drive PWM rectifier according to claim 1, wherein said second threshold value is determined based on at least one parameter selected from among the maximum rated current of said switching devices, current ripple occurring in said three-phase AC current, and the carrier frequency of said PWM carrier.

* * * * *